July 2, 1935.  H. W. GREIDER ET AL  2,006,392
MATERIAL AND ARTICLE CONTAINING FIBER AND METHOD OF MAKING THE SAME
Filed April 10, 1933
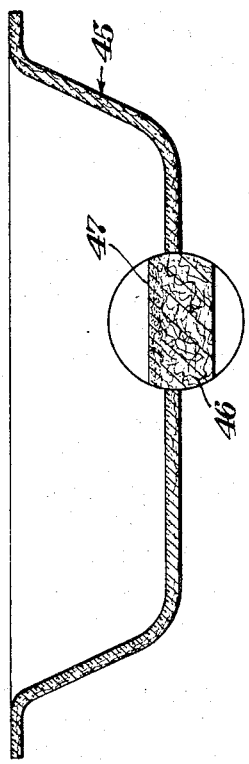
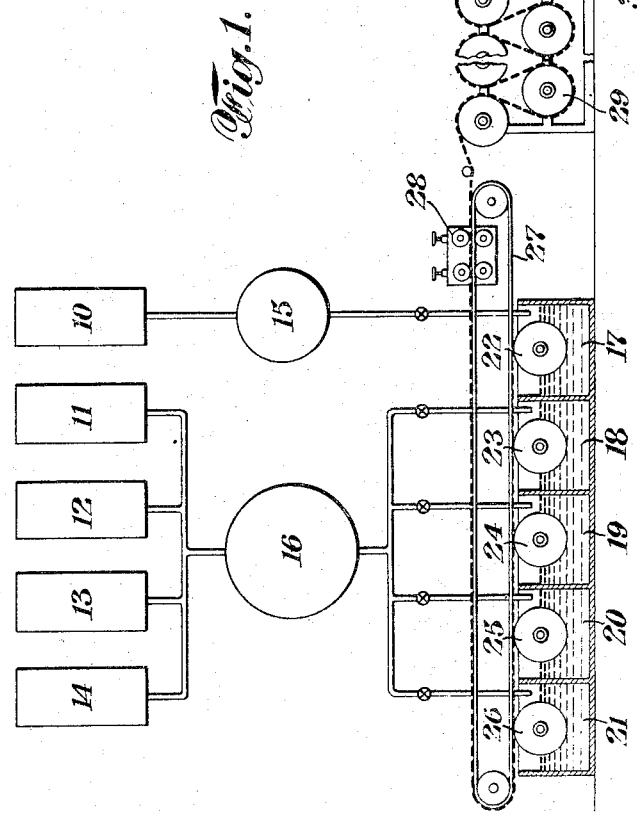
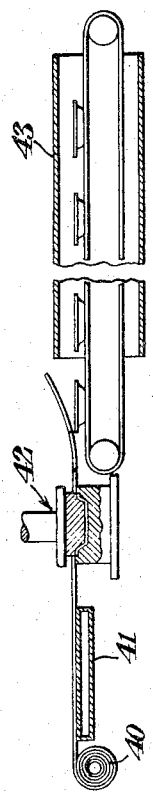
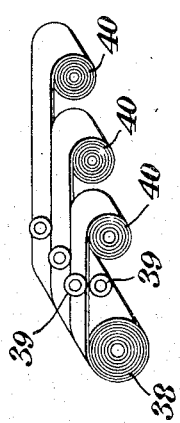
INVENTORS
Harold W. Greider
Marion F. Smith
BY Kenyon & Kenyon
ATTORNEYS Patented July 2, 1935

2,006,392

UNITED STATES PATENT OFFICE 2,006,392

MATERIAL AND ARTICLE CONTAINING FIBER AND METHOD OF MAKING THE SAME

Harold W. Greider, Wyoming, and Marion F. Smith, Cincinnati, Ohio, assignors to The Philip Carey Manufacturing Company, a corporation of Ohio Application April 10, 1933, Serial No. 665,378

50 Claims. (Cl. 92—41)

This invention relates to materials containing fiber and methods of making the same. It relates particularly to fiber-containing materials suitable for the manufacture of various articles and utensils.

It is one of the purpose of this invention to afford articles and materials therefor which are resistant to heat. For example, it is a purpose of this invention to afford receptacles and utensils which can be used for cooking food therein. Thus, one use to which utensils embodying this invention may be put is the baking of pies, cakes, meats, etc. It is a further purpose of this invention to afford the utensils at such a low cost that food can be cooked therein and then sold to consumers without removing the food. The utensils can thereafter be discarded or otherwise disposed of by the consumer.

Features of this invention relate to materials used, combinations thereof, structural combinations, methods of manufacture and the like. The various features of this invention have been developed as a result of research and experimentation in perfecting utensils and other articles which must meet numerous severe and exacting requirements. To illustrate some of the problems which were solved and the manner of their successful solution according to this invention, this invention will be described in connection with pie plates, for example.

In order to be of commercial value a utensil such as a pie plate must be capable of withstanding severe conditions encountered in use and of successfully meeting various requirements. In the first place, a utensil such as a pie plate must be tough, strong and rigid. As a pie plate containing a pie is frequently handled by the rim the pie plate must have sufficient rigidity to resist any deformation when so handled which would result in possible injury to the pie contained therein. The pie plate must not only be tough, strong and rigid when cold but must retain these properties when heated as otherwise the pie plate, particularly the upset border thereof, would sag under the weight of the pie. Further along this line the material of which the pie plate is composed must not weaken during the cooking of foods therein due to the action of water, fats or other substances contained therein or due to the high temperatures used causing excessive carbonization or setting up other destructive action. Commercial baking is frequently conducted at temperatures such as 450° F. and even as high as 500° F. and cooking utensils should be capable of withstanding these high temperatures for a sufficient length of time to permit foods to be cooked therein. The material of which the pie plate is made must not blister or warp when food is cooked therein. The upper surface must be such that a pie crust, after having been baked thereon, will not stick thereto. Still further, the surface of the pie plate should not cause discoloration of foods contacted therewith. The pie plate should be of such character that the surface thereof will not come off in the form of shreds or flakes. In addition the pie plate should contain no material which injures the odor or taste of the food or impairs its value as food.

From a practical and commercial point of view the materials from which the pie plate is made must be inexpensive. Moreover, the manufacturing operations must be simplified as much as possible so as to further reduce the cost of production and the materials used must be capable of lending themselves to simple manufacturing methods. It is important that the materials used after having been formed into a sheet, have a sufficient moist strength to be resistant to rupture and cracking when molded into suitable forms on a punch press, for example.

The advantages of pie plates, for example, manufactured according to this invention, include those resulting both from greater economy and from greater sanitation. Pies have heretofore been baked in tins which are sold with the pie and are later returned. The tins after repeated use become unsanitary, frequently are not properly washed, if washed at all, and are liable to become contaminated with materials left therein prior to return. The return, washing and handling of the tins involve considerable expense. Pies have also, heretofore, been baked in tins and transferred to paper slips prior to sale. This operation requires handling of the pie with expense for labor, breakage of pies, expense by way of labor, and detergents and equipment employed in washing the tins. Such handling also involves a sanitary hazard.

By the use of pie plates manufactured according to this invention, a pie may be baked and sold on the same plate. There is no handling of the pie, return of used tins, washing of tins, expense for paper slips, and the like. Moreover, the pie plates of this invention can be manufactured very inexpensively. Thus increased economy and sanitation are afforded by this invention. Furthermore, it has been found that pies baked in utensils embodying this invention have an improved bottom crust.

Features of this invention relate to certain compositions which are preferably employed in combination as described herein below but which are also in themselves novel and useful. Thus an article, such as a pie plate, may be made up of a substantially rigid heat-resisting base portion or layer of novel composition and an upper or liner portion which is also of novel composition. The result is a new composite fibrous material and article. The combination in a composite sheet of layers having the characteristics herein described is also new.

A novel composition which is of a semi-rigid or substantially rigid character and which is also heat-resisting will first be described. While the composition is useful in itself in making utensils and other articles, it may be used to further advantage according to this invention in connection with a liner portion or surface layer of different composition. The new composition comprises certain new combinations of mineral fiber, organic fiber, and hardening and binding compounds and will be described more in detail below.

Mineral fiber which may be used in the new composition, may be selected from various varieties and/or mixtures thereof which are on the market at the present time, such as asbestoform fibers including the amphiboles and the like. Thus chrysotile, anthophyllite, serpentine, crocidolite, and the like may be used. The use of a mineral fiber which can readily be made up into paper is preferable. The mineral fiber which is commonly sold on the market under the name "asbestos" gives very satisfactory results. Synthetic inorganic fibers including mineral wool and spun glass may also be used. The particular grade of asbestos fiber that is employed, is not critical although the more inexpensive grades of "shingle stock", "paper millboard stock", "cement stock" and that sold as 2x and 3x grades gives very satisfactory results. There are various sizing test for mineral fiber, a common one being to pass the fiber through a bank of 3 screens of 2, 4 and 10 mesh under which a pan is placed. The residue from a one pound sample collected on the four items of equipment after 2 minutes of shaking at 300 R. P. M. is noted. Grades ranging from about 0–1½–9½–5 to about 0–0–5–11 as above tested give very satisfactory results. However, longer or shorter fibers can be used within the scope of this invention and the above figures are merely given as indicative of mineral fiber with which very satisfactory results can be achieved.

An organic fiber is preferably mixed with the mineral fiber. In the practice of this invention it is preferable to use kraft fiber rather than a sulphite fiber. In one of the embodiments of this invention a fibrous sheet is impregnated with a silicate solution. We have found that kraft fiber has a definite attraction for silicate solution whereas sulphite fiber has the contrary property. Thus by mixing with the mineral fiber about 20% to 25%, for example, of kraft fiber on the weight of dry stock prior to treating the fiber, as in sheet form, with silicate solution, the stock is modified so that it will absorb the silicate solution readily and become thoroughly impregnated therewith. The kraft fiber also greatly improves the damp strength of the composition and reduces brittleness in the final dried product. It is preferable to include a drawing fiber such as kraft which is resistant to drawing in punch presses. Any paper making grade of kraft fiber may be used in the practice of this invention. For example, the ordinary #1 grade of kraft fiber may be used to advantage.

While mention has been made of the use of about 20% to 25% of kraft fiber together with asbestos fiber or other mineral fiber, it is to be understood that the percentages named are those which have been found to give preferable results. Thus, lesser quantities of kraft fiber can be used, but as the proportion of kraft fiber is decreased, the resistance of the formed paper to penetration of silicate solution is increased and the damp strength of the formed paper is decreased. However, reasonably satisfactory results have been procured using about 14% of kraft fiber on the dry weight of the fiber composition prior to impregnation with silicate. Increased amounts of kraft fiber above 25% may also be used, although it is usually desirable to use less than about 40% of kraft fiber. It is one of the features of this invention that satisfactory permeability and damp strength are afforded while resistance to carbonization is also afforded when a major proportion of asbestos fiber or other mineral fiber is used in the composition. A composition which resists excessive carbonization and retains its form and a relatively large proportion of its strength after having been used to cook foods therein is to be regarded herein as heat resistant.

While this invention is not to be limited to the correctness of any theory which is advanced herein, it is believed that alkaline method of refining cellulose fiber has an important bearing on the ability of paper containing mineral fiber and organic fiber to absorb silicate solution. While it has been stated that sulphite fiber, a fiber which has been refined by acid methods, is resistant to the penetration of silicate solution, even sulphite pulp can be rendered more susceptible to the penetration of silicate by rendering the sulphite fiber alkaline. This can be done in several ways as by adding an alkali thereto such as sodium silicate. While the sulphite pulp rendered alkaline can be used in the practice of this invention, sulphite fiber does not impart as high a degree of strength to the resultant composition as does kraft fiber. Cotton fiber may also be used, although cotton fiber, unless rendered alkaline, is more resistant to impregnation with silicate solution than is kraft fiber. In the case of the cotton fiber, the increase in its capacity to absorb silicate solution which is afforded by making the same alkaline may be due either to the presence of the alkali on the fiber or to the removal of oils from the fiber, or both. In rendering fiber alkaline, any suitable alkali may be used in addition to sodium silicate, e. g., sodium hydroxide, soda ash, ammonia, borax, sodium phosphate, and the like. It is one of the features of this invention to mix an alkaline and/or an alkaline-refined cellulose fiber with a mineral fiber and impregnate a paper made from the mixed fiber with a soluble silicate. The presence of alkaline or alkali-treated fiber with the mineral is especially advantageous according to this invention when the resulting sheet is impregnated from one surface only. The employment of such cellulose fiber in substantial proportion enables one to incorporate a proper proportion of silicate solution. If the alkali-treated fiber were not used, the result would be either insufficient penetration of the web with silicate solution (if a concentrated solution were used) or insufficient residual dry silicate in the web (if a more dilute solution were used).

In the practice of this invention it is preferable to add to the mixture of inorganic mineral fiber and cellulose fiber, a small proportion of a binder such as starch. The presence of about 3% to 7% of a substance such as starch gives the base portion of the new composition greater hardness and rigidity when the finished article has been formed and dried. It also increases the damp strength of the composition so that resistance to cracking and breaking in forming utensils is increased. Other binders which can be used are casein, glue, rubber latex, and the like. Starch is ordinarily preferable, however, as this substance has been found to be free from any objectionable odor or taste and to resist decomposition. Starch is also in itself a food product The amount of starch that is used is not regarded as critical; however, enough starch is preferably used to give an increased stiffening and binding effect to the composition. The use of excessive amounts of starch makes the composition less permeable and increases the resistance of the paper to impregnation with silicate solution. Another binder which may also be used to advantage is highly beaten cellulose fiber. When cellulose fiber has been beaten until it is substantially in the form of a fiber gel, the resultant product acts as a binder for the kraft fiber and the asbestos fiber and aids in giving the material increased damp strength and increased hardness and rigidity when dried.

The mixture of mineral fiber, organic fiber, and binder (if any binder is used) is made into a sheet of fibrous paper, as will be described more in detail below. After the paper has been formed and partially dried, as will also be described below, the paper is treated with a silicate solution so as to impregnate the sheet as thoroughly as possible with silicate. We have found that commercial sodium silicate solution of about 40° to 42° Bé., (properly diluted) may be used advantageously in the practice of this invention. This commercial product is relatively inexpensive and is readily available. Preferably the silicate solution of about 40° to 42° Bé. is diluted in the proportion of 3 parts by weight of water to 10 parts by weight of the concentrated silicate solution. One of the problems solved by this invention was the compounding of a silicate solution which would both penetrate the fiber web and leave a proper amount of silicate permeating the web after the web had been dried. However, other degrees of dilution can be used. For example, only one part of water to 10 parts of silicate solution can be used and some penetration of the paper will be secured. However, as the solution is more viscous and thick, the penetration of the silicate is not as great as when a more dilute solution such as the dilution first above mentioned is used. On the other hand, high degrees of dilution such as would be afforded by using 10 parts of water to 10 parts of the concentrated sodium silicate solution may also be used, but the sheet does not saturate any more readily with the more dilute solution and after the water has evaporated from the paper, a lesser quantity of dry sodium silicate is left in the fiber. The resultant product is not as rigid, as where the more concentrated solution is used and has an increased tendency to blister. It is ordinarily preferable to use dilutions of the said commercial sodium silicate solution ranging from 2 parts of water and 10 parts of sodium silicate, to 6 parts of water and 10 parts by weight of sodium silicate. Using these concentrations, a sheet to which the silicate has been applied has been found to carry a maximum amount of silicate which eventually penetrates the fiber and acts as a hardening agent. Moreover, if too high a concentration of sodium silicate solution is used, a film forms on the sheet which tends to stick to the drying rolls or punch presses.

The sodium silicate solution which is of about 40° to 42° Bé. and which is, as aforesaid, a standard commercial product at the present time, has a ratio of soda ($Na_2O$) to silica ($SiO_2$) of about 1:3.25. It is to be understood, however, that other grades of sodium silicate may be used. Thus, the grades having a soda-silica ratio of 1:4 may be used. Also grades having a soda-silica ratio as high as about 1:2 may be used. In this connection, however, the silicates with a high proportion of soda are ordinarily more expensive. Also the high-silica sodium silicates form somewhat harder gels and set more quickly. For both of these reasons it is ordinarily preferable to use sodium silicate solutions which are high in silica rather than in soda. In addition to sodium silicate other soluble silicates may also be used.

The amount of silicate which is absorbed by the fibrous composition is not critical although it is ordinarily desirable to saturate the mixture of mineral and organic fibers with silicate solution so as to incorporate as much silicate as possible in the product after it has been dried. Ordinarily it is desirable to incorporate about 20% to 35% of dry silicate in the composition. Using the concentrations of silicate solution above described especially when alkali treated cellulose fiber is present in the web, the above amounts of silicate (dried in the web) can be readily incorporated. When the resultant product is formed into a sheet, a sheet only about 0.035" thickness is so rigid after drying that a pie plate can be made therefrom which will support merely by the rim the weight of a pie contained therein with very little deformation. An article having such characteristics will be referred to herein for the sake of brevity as being substantially rigid. While the use of soluble silicate is preferable as a rigid binder, it is not without the scope of some aspects of this invention to employ other bonding materials for the fiber such as resins which have the property of becoming hard and rigid after fiber has been impregnated therewith.

The resulting composition is useful for a variety of purposes and can be made into various articles and utensils. For certain purposes, however, it is preferable to use the new composition according to this invention with a top composition or liner which will be hereinafter described. The liner preferably should not cause discoloration of fruit juices and should be sufficiently impervious to prevent water or fruit juices from soaking therethrough and permitting dissolved substances in the lower or base material from coming to the surface of the liner material and discoloring fruit juices. Moreover, the liner should be hard and of such a character as not to stick to pies, for example. The liner also must not blister, or separate from the base portion of the sheet when heated as in baking.

In the practice of this invention, one is enabled to make a base portion and a liner portion by a single paper making operation, and a sheet so produced can be treated with silicate solution, while retaining the proper individual characteristics of both the base portion and liner.

It is one of the features of this invention that silicate solution is applied to a fibrous sheet so that only one surface of the sheet contains alkali silicate. The manufacture of sheet material which is alkaline on one surface only can be accomplished by using a concentration of alkali silicate solution which is so high that it does not penetrate completely through the paper when applied to one side thereof even when the treated sheet is dried gradually. Another way of preventing the sodium silicate from striking through the fibrous sheet is to dry the treated sheet so rapidly that the silicate solution does not have time to penetrate completely through the sheet prior to drying. While either of these methods is regarded as an imperfect method of practicing this invention, optimum results are not achieved, as thorough impregnation of the base portion is not effected.

It is preferable according to this invention to combine with a base portion which is freely permeable to silicate solution, a liner portion which resists the penetration of silicate solution therethrough. Thus, the base portion can be completely saturated with the silicate solution and the liner portion can be kept substantially free of the silicate solution.

As one of the features of the upper liner which cause it to resist the penetration of silicate solution therethrough, there is employed according to this invention a fiber which in itself is not readily saturated with the sodium silicate. Thus, in the upper liner it is preferable to use a sulphite fiber. Sulphite fiber has been found to resist the penetration of sodium silicate solution therethrough to a fairly high degree. Other acid or acid-treated fibers than sulphite fiber may be used instead of sulphite fiber. Any suitable paper making grade of sulphite or other fiber may be used such as #1 grade, for example.

To further increase the impermeability of the liner material to the penetration of silicate solution therethrough, the liner is strengthened and partially waterproofed by the addition of certain materials to the sulphite fiber. Thus, a binder may be added to the sulphite fiber such as casein. Ordinarily about 10% of casein is preferable in strengthening the sulphite fiber and in somewhat increasing its water-proof characteristic. The fact that acid or acid-treated fiber is used in the liner also acts to prevent any fermenting of the casein binder. Other binders than casein may also be used, such as glue, rubber latex, and the like. While starch is a satisfactory binder for some purposes, it is not desirable for certain uses, inasmuch as pies, for example, tend to stick to liners wherein starch is used as a binder.

It is also preferable in the practice of this invention to mix a water-proofing compound with the upper liner material. A very satisfactory water-proofing compound is stearic acid. Other similar materials such as oleic and palmitic acids may also be used to increase the water-proof characteristic of the upper liner. About 2% of stearic acid in the upper liner material ordinarily gives very desirable results. Other water-proofing agents such as waxes, greases, oils, resins and the like may also be used.

The proportions of binder such as casein and water-proofing compounds such as stearic acid which are used are not regarded as critical. However, enough of both of the materials should be used so as to give the desired binding and waterproofing properties to the finished product. Ordinarily about 5% to 15% of casein together with about 1% to 5% of water-proofing compound, such as stearic acid, gives very satisfactory results. Ordinarily it is preferable to not use a quantity of waterproofing agent which makes the liner absolutely impervious, as a slight permeability to water vapor is desirable in permitting the escape of moisture and preventing blistering.

In making the upper liner material sulphite fiber, for example, is mixed with a binder such as casein and a water-proofing compound such as stearic acid in a water mix. An alkali metal salt of stearic acid, e. g. soap flakes, may be used. A certain amount of soda ash or other alkali is also added so as to place the casein and stearic acid in a form for thorough dispersion through the material. Prior to forming paper from the furnish thus produced, acid such as hydrochloric acid may be added so as to precipitate the casein and stearic acid on the sulphite fiber. The presence of the acid also increases the resistance of the paper made from the material to penetration by sodium silicate.

In the manufacture of the upper liner material, it is preferable to use a substantial proportion of the sulphite fiber in a very highly beaten state. When the sulphite fiber is very highly beaten, the character of the sulphite fiber is modified, the individual character of the fibers scarcely being apparent. If all of the sulphite fiber were very highly beaten, a very hard, dense, and water-proof material would be made. However, it is ordinarily preferable to use a certain proportion of the sulphite fiber in a highly beaten state together with a certain proportion of the sulphite fiber in a lightly beaten state. The presence of the lightly beaten fiber appears to render the upper liner sufficiently porous to permit the gradual escape of any residual moisture in the plate during drying and/or baking, thus preventing the upper liner from blistering and separating from the lower base portion. Even if the fiber sheet is dried completely, it will subsequently absorb about 3% to 5% of moisture from the air and slight perviousness to gradual escape of water vapor tends to prevent the sealing in of water vapor and expanding of the sheet. However, the slight degree of porosity afforded by the lightly beaten sulphite fiber is not sufficient to permit the viscous sodium silicate solution to strike therethrough during the impregnation of the composite paper with sodium silicate solution. It is one of the features of this invention that the upper liner is substantially impervious to penetration by sodium silicate solution as the silicate solution is applied but is sufficiently pervious to water vapor to permit water vapor to escape without causing blisters. A layer which substantially prevents silicate solution from striking therethrough during the impregnation operation and substantially prevents water from soaking therethrough and dissolving silicate, which may diffuse back through the layer during a baking operation, for example, is to be regarded as substantially impervious to silicate solution, for the purposes of this description. In addition to contributing to make the liner layer substantially impervious to silicate solution, the highly beaten fiber acts to a considerable degree as a binder for the lightly beaten fiber. Moreover, the highly beaten fiber has been found to prevent shrinking of the liner layer during drying and to prevent pulling away of the liner from the lower or base layer. The relative proportions of lightly beaten sulphite fiber and highly beaten sulphite fiber can be varied considerably although usually it is preferable to use the lightly beaten and highly beaten portions in about equal proportions. Other highly beaten fibers or finely-divided substances, the particles of which are relatively smaller than the fiber of the fiber portion may also be employed in the practice of this invention to render the liner substantially impervious to silicate solution while retaining sufficient porosity to permit escape of water vapor. Satisfactory results are obtained using highly beaten fiber in proportions such as 25% to 75% and using lightly beaten fiber in proportions such as 25% to 75%.

A further advantage of a liner made according to this invention is that the casein, stearic acid and highly beaten fiber pulp tend to prevent a pie crust, for example after having been baked, from sticking thereto. Moreover, there is nothing in the liner which affects the color, taste, odor, or food properties of foods cooked in contact therewith.

While the liner portion has been described as being combined with the base herein above described, the liner portion in itself is to be regarded as one of the features of this invention. Moreover, the liner portion may be combined in the manufacture of composite sheet material with other base portions than the base portion hereinabove described and the combination of a liner having any or all of the properties of the liner herein described with a base portion is to be regarded as coming within the scope of this invention. Also the combination in a fibrous sheet of layers bonded by different bonding agents and the combination of layers having characteristics of the layers therein described, is to be regarded as coming within the scope of this invention.

For purposes of illustration, this invention will now be described in connection with the manufacture of articles comprising a substantially rigid, heat-resisting base portion containing about 55% asbestos fiber (about $3x$ grade), about 14% kraft fiber (about #1 grade), about 27% dry silicate of soda, and about 4% starch, and comprising also a liner portion containing about 88% of sulphite fiber (about #1 grade) made up of substantially equal proportions of highly beaten fiber and lightly beaten fiber together with about 10% of casein and 2% of stearic acid.

The manufacture of the articles having the above composition will be described in connection with the accompanying drawing wherein Fig. 1 is a diagrammatic representation of a paper mill which may be used in the manufacture of fibrous compositions embodying this invention;

Fig. 2 is a diagrammatic representation of means for slitting a wide sheet into a plurality of narrow sheets;

Fig. 3 is a diagrammatic representation of a punch press for stamping out articles in suitable form; and Fig. 4 is a sectional view of an article embodying this invention, a portion thereof being enlarged to show an arrangement of base portion and liner portion in the finished article.

The pulp from which the paper is made is mixed in beaters 10, 11, 12, 13, and 14. The materials entering into the surface or liner portion of the composite sheet are mixed in the beater 10. The solids are mixed with the water in beater 10, there being about 10% solids and 90% water in the resulting mixture. Of the 88% of sulphite fiber which is used in the manufacture of the composition above mentioned, about 44% of the sulphite fiber only is added initially. This portion of the sulphite fiber is beaten very thoroughly until the individual fibers have been reduced to a very small state and until the pulp assumes a uniform and substantially non-fibrous appearance. Usually beating for about 2 to 4 hours is sufficient to produce the highly beaten sulphite fiber. The remainder of the sulphite fiber, namely, 44% is then added and beaten until the sulphite fiber has been distributed uniformly through the mass, and lumps have been removed. Beating for about ½ hour is ordinarily sufficient for beating and distributing the lightly beaten sulphite fiber. The casein is then added, together with stearic acid, the latter being in the form of soap flakes. Sufficient soda ash (about 2% on the weight of the dry material in the furnish) is also added to promote the complete dispersion in the mass of the casein and soap. After the casein and soap have been distributed through the mass, the mass is acidified by the addition of hydrochloric acid. For this purpose about 10% of the weight of the mass of commercial hydrochloric acid (35% concentration) is usually required. However, the amount of hydrochloric acid which is added varies under different conditions. Sufficient hydrochloric acid should be added to precipitate the casein and to precipitate the soap flakes as stearic acid and the addition of a substantial excess of acid is preferably avoided. The mixture in beater 10 is then transferred to any suitable storage chamber such as that indicated by the reference character 15.

The furnish which is used in making the heat-resisting, substantially rigid layer or base portion of the composition is mixed in beaters 11, 12, 13, and 14. The entire amount of kraft fiber is first added to the beaters and is beaten until it is thoroughly fiberized in the water. The asbestos fiber is then added and thoroughly commingled with the kraft fiber. If a binder such as starch is used, the starch may be added at this time. The resulting mixture may contain about 90% of water and about 10% of solids, although the specific amount of water that is used is not regarded as in any sense critical. After the mixing has been completed, the beaten mixture may be transferred to one or more storage tanks 16.

The beaten stock contained in storage tanks 15 and 16 may now be used in the manufacture of paper by transferring the same to the cylinder vats 17, 18, 19, 20 and 21 of the paper making machine. In each of the vats, paper making cylinders 22, 23, 24, 25, and 26 of the usual filter screen construction are used to form a web of paper according to the methods well known in the paper making art. In each of the cylinder vats the stock mixtures are preferably diluted to roughly about 1% of solids to 99% of water although the amount of dilution is in no sense critical.

The furnish for the liner is made into a web in cylinder vat 17 by paper cylinder 22 and the formed web in the wet condition is carried from the cylinder 22 by a felt 27. The felt 27 and web from paper cylinder 22 thereafter pick up additional webs made from the furnish for the heat-resisting substantially rigid base portion from paper cylinders 23, 24, 25, and 26. In the diagrammatic representation of the paper machine there is but a single paper making cylinder for making the liner portion and there are four paper making cylinders for forming the thicker, substantially rigid, heat-resisting base portion of the resulting composite sheet. This arrangement has been found to give a satisfactory product for pie-plates and the like. However, the number of paper cylinders used to make the base and liner portions of the composite sheet and articles made therefrom may be varied without departing from the scope of this invention and it is to be understood that the sheet can be built up to any desired thickness.

In the diagrammatic representation of the apparatus which is shown, the paper stock in beaters 11, 12, 13, and 14 is transferred to a common storage tank or chest 16 from which the furnish for cylinder vats 18, 19, 20 and 21 is taken, the furnish in each of the cylinder vats being the same. This arrangement from the point of view of commercial operation has been found to be convenient and to produce a satisfactory product. However, it is within the scope of this invention to vary the furnishes in cylinder vats 18, 19, 20 and 21. If the furnishes are varied, separate beaters and separate storage vats could be conveniently employed in supplying different furnishes to the different cylinder vats. For example, it would be within the scope of this invention to make up a mixture in beater 14 which does not contain any starch and to transfer the mixture without starch content to cylinder vat 21. In making certain compositions, the absence of starch in the bottom layer of the composite sheet renders the bottom layer more permeable to impregnating compositions such as sodium silicate. Also, in one or more of the lower layers of the resulting composite paper it may be desirable to increase the proportion of cellulose fiber such as kraft fiber so that the lower layers may be more readily impregnated with impregnating compositions. Any such variations in the process or resulting product are to be regarded as within the scope of this invention.

After the various surface or liner layers and base layers or portions of fibrous composition have been picked up on the felt 27, the felt is inverted, as shown in the drawing, so that the liner portion of the fibrous composition forms the bottom surface. Details as to the arrangement and travel of the felt are omitted in the diagram as these arrangements are well known in the paper making art. Also, the upper felt which may be applied to the upper surface of the fibrous composition is not shown in the drawings as such arrangements are well known in the paper making art. Mechanisms for washing the carrying felts are also not shown. After the fibrous sheet has been formed on the paper making cylinders and picked up by the endless felt, it may be run between squeeze rolls 28 to remove excess water and to compact the sheet. By successively picking up the surface or liner layers, and the base layer or layers in the form of wet webs and pressing them together, the fibers in the various layers become to a certain extent interfelted.

After leaving the squeeze rolls, the endless felt or felts are stripped from the fiber sheet and the fiber sheet is passed to any suitable number of drying rolls 29 which may be heated in any suitable manner. Preferably the fibrous sheet is only partially dried. For example, preferably about 20% to 40% of water on the weight of the dry fiber sheet is retained in the sheet. It has been found according to this invention that the absorption of silicate solution is favored when the sheet has been partially dried but has not been completely dried. It is usually preferable to retain about 30% moisture in the sheet although this figure is not to be taken as critical. If the fiber sheet is dried excessively, an impervious surface crust is formed and the silicate solution is not absorbed satisfactorily.

After the fibrous sheet has been partially dried on the drying rolls 29, silicate solution (e. g. 10 parts sodium silicate 40° to 42° Bé. to 3 parts of water; about 1.30 Bé.) from any suitable container 30 is run down to impregnating roll 31 and is applied to the upper surface of the fibrous sheet only, any excess running off at each end of the fold and being collected in trough 32. It has been found that penetration of the web by the silicate solution is favored by applying the silicate to the upper side of the web. The fibrous sheet coated on one side with silicate solution is then run over a plurality of rolls 33 which are preferably not heated. The silicate is thus given an opportunity of penetrating into the fibrous composition.

In order to insure complete impregnation of the base layer of the fiber composition with silicate solution, additional silicate solution is applied to the fibrous sheet from container 34 by means of roll 35. In this case, also, the silicate solution is applied to one surface only of the fibrous sheet, namely, the surface of the layer which is to form the heat-resisting semi-rigid base portion of the completed composite material. After leaving the second bath of silicate solution, the sheet will usually contain about 100% water calculated on the dry weight of the sheet, although this figure is not to be taken as critical. The drying of the fibrous sheet is now continued by means of drying rolls 36. In this connection we find that it is preferable to heat only those drying rolls of the drying rolls 36 which are contacted with the liner portion of the impregnated fibrous sheet as this procedure promotes drying and penetration of the silicate and prevents the sheet from sticking to the hot rolls. The drying operation is carried on until the water content has been reduced to about 17% to 35% on the basis of the dry weight of the finished article. The impregnated sheet may then be subjected to calender rolls 37 to compact the same and give the sheet smooth surfaces. The sheet can then be wound on suitable rolls 38.

The manufacture of the sheet composition has now been completed. The sodium silicate will be found to have very thoroughly permeated the layer containing mineral fiber and not to have permeated to any substantial degree the surface or liner layer. Thus the liner surface is kept entirely free from alkali. This is an important feature of this invention for if the liner surface of the sheet were alkaline, as by including therein sodium silicate, the alkali would tend to discolor fruit juices contracted therewith (e. g. turn cherry juice blue-green). Moreover, the liner is so impervious that water will not permeate through the liner and cause dissolved alkali from the base layer to diffuse to the surface of the liner.

The sheet composition, if desired, can be seasoned for 24 hours or more, although the seasoning operation is not essential.

If it is desired to make the sheet composition into articles or utensils, the sheet material 38 can be run under slitting rolls 39 (Fig. 2) so as to produce sheets in widths which are adapted for the formation of desired articles therefrom, which sheets can be rolled in rolls 40 or passed directly to a forming machine such as a punch press, for example.

In Fig. 3 means are shown diagrammatically for forming the sheet material into suitable articles such as pie-plates. The sheet material taken as from the roll 40 may contain about 17% to 35% moisture and as the fibrous material is damp it can be formed into suitable shapes as by stamping. Prior to the forming operation, it has been found preferable to run the sheet over a drying plate so as to remove most of the surface moisture leaving, however, about 20 to 25% of moisture in the body of the sheet. The removal of surface moisture has been found to prevent sticking of the sheet to forming dies. A drying plate heated by any suitable means not shown is indicated diagrammatically by the reference character 41. After the surface moisture has been removed, the sheet material is then taken to forming apparatus such as the punch press 42. Due to the special composition of the sheet, it has sufficiently high damp strength to resist tearing in the punch press. The punch press 42 may be designed to punch out and cut pie-plates, for example. Scrap material may be separated from the completely formed pie-plates and the pie-plates may be taken through a drying tunnel 43 which may be maintained at any suitable temperature such as about 175° F. depending on the rate of drying desired. In the drying tunnel the moisture content is reduced to about 5% to 10% on the dry weight of the finished articles.

A formed article, e. g. a pie-plate, is shown in Fig. 4. The reference character 45 indicates the article as a whole. In the portion of the sectional view shown in enlargement it is to be observed that the pie-plate comprises a plurality of layers. Thus, the pie-plate may comprise a substantially rigid, heat-resisting base portion or layer 46 and a liner portion or surface layer 47. The manufacture of the finished article comprising such portions is to be regarded as only one form of this invention. The substantially rigid, heat-resisting base portion may itself be made up of a plurality of layers varying somewhat in composition, as hereinabove pointed out. Moreover, the liner layer 47 may be made up with a plurality of layers varying in composition.

While this invention has been described in connection with the manufacture of pie plates, by way of illustration, other articles and utensils may also be manufactured according to this invention such as cake pans and meat pans, which may be of any suitable shape, e. g. round, rectangular and the like, and in which foods may be cooked. Articles made according to this invention are useful for other purposes than cooking foods therein. They are stronger and more rigid than the usual type of paper plate and are preferable to the ordinary paper plate when used for picnics, festivals and the like. In this connection the cost of the materials and manufacturing operations involved in making utensils according to this invention is so low that the finished product can compete with ordinary paper plates. Utensils embodying this invention may be used for making frozen articles. Furthermore, the composite sheet as well as the compositions of the component parts of the composite sheet may be used for a variety of purposes. Thus the compositions may be used for a variety of purposes as when heat-resisting and non-inflammable properties are desired. For example, the compositions may be used for ash trays, table mats, liners for bottle caps and the like.

While this invention has been described in connection with certain specific illustrations, it is to be understood that this has been done merely for the purpose of illustrating this invention and that the scope of the invention is not to be limited thereby.

We claim:

1. Composite sheet material of hard, semi-rigid and heat-resisting character which comprises a layer containing mineral fiber, said fiber being disposed in a water-laid, felted, and compacted sheet and being permeated with a hard heat-resisting bonding material and a surface layer which is substantially free of mineral fiber and which is substantially free of and is substantially impermeable to the bonding material used for permeating said layer containing mineral fiber.

2. Composite sheet material of hard, semi-rigid and heat-resisting character which comprises a base layer containing mineral fiber, said fiber being disposed in a water-laid, felted and compacted sheet and beeing permeated with an inorganic heat-resisting bonding material and a fibrous surface layer substantially free of mineral fiber and bonded by a bonding material other than the bonding material for said base layer and impregnated with a waterproofing material, the contacting surfaces of said layers being interfelted.

3. Composite sheet material comprising a layer of water-laid, felted and compacted fiber containing mineral fiber and permeated with a soluble silicate to form a hard, dense, semi-rigid sheet and a surface layer which is substantially free of silicate and which is substantially impermeable to soluble silicate.

4. Composite sheet material comprising a layer of water-laid, felted and compacted fiber containing mineral fiber and permeated with a soluble silicate to form a hard, dense, semi-rigid sheet and a surface layer which is substantially impermeable to silicate solution and which contains fiber permeated with a binder substantially free of silicate, the contacting surfaces between said layers being interfelted.

5. Composite sheet material comprising a layer containing water-laid, felted and compacted fiber permeated with a soluble silicate to form a hard, dense and semi-rigid sheet, the major proportion of fiber in said layer being mineral fiber, and a surface layer containing cellulose fiber and a binder for said fiber, said surface layer being substantially free of silicate and being substantially impermeable to soluble silicate, the contacting surfaces between said layers being interfelted.

6. Composite sheet material comprising a base layer containing water-laid, felted and compacted fiber permeated with a soluble silicate to form a hard, dense and semi-rigid sheet, the major proportion of fiber in said layer being mineral fiber, and a surface layer containing fiber permeated with an organic binder and with a waterproofing material, the fiber in said surface layer being composed substantially of cellulose fiber and being interfelted with fiber contained in said base layer.

7. Interfelted fibrous sheet material comprising a layer which is permeable to soluble silicate solution and a layer which is substantially impermeable to soluble silicate solution, said permeable portion being permeated with silicate and said substantially impermeable portion being substantially free of silicate and said layers being interfelted with each other.

8. Composite sheet material comprising a layer containing mineral fiber permeated with soluble silicate and a surface layer which is substantially impermeable to silicate solution and is substantially free of silicate but which has such perviousness as to permit the gradual escape of water vapor therethrough.

9. Composite sheet material comprising a layer of felted and water-laid fiber containing mineral fiber and permeated with a water-soluble bonding material and a water-laid fibrous surface layer which is very difficultly permeable by water in liquid state.

10. Composite sheet material comprising a body layer containing a major proportion of mineral fiber and a bonding material therefor and a surface layer comprising fiber and a water-insoluble and grease-insoluble binder for said fiber, said binder for said surface layer being different from the binder for said body layer.

11. A heat-resisting interfelted fibrous composition containing a major proportion of mineral fiber, a minor proportion of cellulose fiber having a greater attraction for soluble silicate than said mineral fiber, and a soluble silicate distributed through said fiber, said fiber containing mineral fiber being rendered more highly saturated with said silicate and more firmly bonded by said silicate due to the presence of said cellulose fiber to form a hard and substantially rigid mass, the mass as a whole being highly heat-resistant due to the high proportion of inorganic material contained therein.

12. A heat-resistant interfelted fibrous composition containing a major proportion of mineral fiber, a minor proportion of alkali-treated cellulose fiber, and a soluble silicate distributed through the fiber, the soluble silicate being more than about 20% by dry weight of the composition.

13. A heat-resistant interfelted fibrous composition containing a major proportion of mineral fiber, a minor proportion of kraft fiber, and a soluble silicate distributed through the fiber, said fiber containing mineral fiber being more highly saturated with said silicate and more firmly bonded due to the presence of said kraft fiber to form a hard and substantially rigid mass, the mass as a whole being highly heat resistant due to the high proportion of inorganic material contained therein.

14. An interfelted fibrous composition containing about 55% to 85% asbestos fiber and about 14% to 40% of kraft fiber on the weight of dry fiber and an alkali metal silicate distributed through the fiber, the alkali metal silicate being more than about 20% by dry weight of the composition.

15. An interfelted fibrous composition comprising a major proportion of mineral fiber, a minor proportion of cellulose fiber, more than about 20% of soluble silicate by dry weight, and about 3% to about 7% of an organic binder selected from the group consisting of starch, casein, glue, and rubber latex.

16. An interfelted fibrous composition comprising a major proportion of mineral fiber, a minor proportion of alkali-treated cellulose fiber, over about 20% of alkali metal silicate, and starch.

17. An interfelted fibrous sheet comprising about 55% to 85% asbestos fiber, about 14% to 40% of kraft fiber, about 20% to 35% of alkali metal silicate and about 3% to 7% starch.

18. An article comprising a base layer containing mineral fiber and alkali-metal silicate in combination with a surface layer containing fibrous composition containing a substantial proportion of highly beaten cellulose fiber, a substantial proportion of lightly beaten cellulose fiber mixed with said highly beaten cellulose fiber, and a binder permeating the mixed fibers.

19. An interfelted fibrous sheet containing a major proportion of a mixture of highly beaten cellulose fiber and of lightly beaten cellulose fiber and a minor proportion of casein and a waterproofing material distributed through the fiber.

20. An article comprising a base layer containing mineral fiber and alkali-metal silicate in combination with a surface layer containing composition comprising a major proportion of interfelted cellulose fiber, a filler of substantially smaller particle size than said fiber mixed with said fiber, and a binder for said fiber and filler.

21. An interfelted fibrous sheet containing about 25% to 75% of highly beaten sulphite fiber, about 25% to 75% of lightly beaten sulphite fiber, and a minor proportion of casein and fatty acid distributed through the fiber.

22. An article of formed fibrous sheet material comprising a base layer containing mineral fiber impregnated with silicate and a surface layer containing fiber bonded by a non-alkaline and non-starchy binder, the fiber of said surface layer being interfelted with fiber of said base layer.

23. An article comprising a base portion containing a major proportion of mineral fiber impregnated with an alkali metal silicate and a non-alkaline fibrous liner which is substantially impervious to penetration by alkali metal silicate solution.

24. An article comprising a substantially rigid heat-resisting base portion and a liner therefore comprising cellulose fiber and a non-starchy binder for the fiber.

25. An article comprising a base portion containing mineral fiber, a cellulose fiber and soluble silicate and a liner portion containing sulphite fiber.

26. An article comprising a base portion containing a mineral fiber, an alkali-treated cellulose fiber and soluble silicate, and a liner portion comprising an acid-treated fiber and a binder for the acid treated fiber, said liner being substantially free of alkali.

27. An article formed from a composite fibrous sheet comprising a base portion containing a major proportion of mineral fiber, a minor proportion of kraft fiber and an alkali metal silicate and a liner portion containing sulphite fiber, a binder for the sulphite fiber and a water-proofing compound, said liner portion being substantially free of alkali and being substantially impervious to alkali metal silicate solution.

28. An article formed from a composite fibrous sheet comprising a substantially rigid heat-resisting base portion and a liner containing a fibrous material and a substantial proportion of a finely-divided substance distributed through said fibrous material, the particles of said finely-divided substance being substantially smaller than the fibers of said fibrous substance and mixed therewith, and a binder for said fibrous material and finely-divided substance.

29. An article comprising a substantially rigid heat-resisting base portion and a liner containing a felted fibrous material and a binder for said fibrous material.

30. An article comprising a substantially rigid heat-resisting base portion and a liner therefor containing a felted fibrous material and a waterproofing substance.

31. An article comprising a substantially rigid heat-resisting base portion and a liner therefor containing a felted fibrous material and a substance selected from the group consisting of oils, greases, fatty acids and resins.

32. An article formed from a composite fibrous sheet comprising a base portion containing a major proportion of asbestos, about 14% to 40% of kraft fiber and alkali metal silicate permeating said fiber to give rigidity to the fiber, and a liner portion containing about 25% to 75% of highly beaten sulphite fiber, about 25% to 75% of lightly beaten sulphite fiber, about 5% to 15% of casein and about 1% to 5% of a substance selected from a group consisting of fatty acids, waxes, oils and greases.

33. An article formed from a composite fibrous sheet comprising a base portion containing a major proportion of asbestos, about 14% to 40% of kraft fiber, alkali metal silicate permeating said fiber to give rigidity to the fiber and about 3% to 7% starch, and a liner portion containing about 25% to 75% of highly beaten sulphite fiber, about 25% to 75% of lightly beaten sulphite fiber, about 5% to 15% of casein and about 1% to 5% of a substance selected from a group consisting of fatty acids, waxes, oils and greases.

34. In a method of making paper wherein mineral fiber is made into a fiber sheet and the sheet subsequent to the formation thereof is impregnated with a solution of silicate by subjecting the sheet to contact with said solution and excess moisture is thereafter removed by drying, the step comprising mixing alkali-treated organic fiber in minor proportion with mineral fiber prior to impregnating the paper with silicate solution.

35. In a method of making paper wherein fiber is made into a fiber sheet and the fiber sheet is impregnated with a solution of silicate, the steps comprising applying silicate solution to one surface only of the fiber sheet and drying the sheet prior to penetration of the silicate solution to the opposite surface of the sheet but not before the silicate solution has penetrated and become impregnated through at least about half the thickness of the sheet.

36. In a method of making a fibrous composition wherein a mixture of mineral and cellulose fiber is interfelted and the interfelted fiber in a formed body is impregnated with a solution of silicate by absorption of the silicate solution from the exterior of the body, the step comprising imparting alkaline characteristics to the cellulose fiber prior to impregnating the mixed fiber with silicate solution.

37. In a method of making paper wherein a fiber is made into a fiber sheet and the fiber sheet is impregnated with a solution of silicate, the steps comprising forming a sheet having a surface layer pervious to silicate solution and a second layer interfelted with the first layer of substantially less perviousness to silicate solution, and contacting with silicate solution only the external surface of the pervious layer of the sheet.

38. In a method of making paper wherein fiber is made into a fiber sheet and the fiber sheet is impregnated with a binder, the steps comprising making a sheet having a surface layer pervious to the binder and a layer of substantially less perviousness to the binder, and contacting with the binder only the external surface of the pervious layer of the sheet.

39. In a method of making paper wherein fiber is made into a fiber sheet and the fiber sheet is impregnated with silicate solution, the steps comprising forming a fiber sheet from wet furnish, partially drying the sheet, applying silicate solution to one surface only of said sheet and drying said sheet by applying drying heat to the opposite surface only of the sheet before the silicate solution penetrates to said opposite surface.

40. In a method of making an article from a fibrous sheet, the steps comprising forming a fiber sheet from wet furnish, partially drying the sheet, impregnating the sheet with silicate solution, forming an article from the impregnated fiber sheet by an operation resulting in a formed article distinct from the sheet from which the article is formed, and drying the formed article.

41. In a method of making paper wherein fiber is made into a fiber sheet and the fiber sheet is impregnated with silicate solution, the steps comprising forming a sheet from wet furnish having a surface layer pervious to silicate solution and integral therewith a layer which is substantially impervious to silicate solution, partially drying the composite sheet, applying silicate solution to the pervious layer only, after an interval of time applying silicate solution again to the same surface of said sheet, and drying said sheet.

42. In a method of making paper wherein fiber is made into a fiber sheet and the fiber sheet is impregnated with silicate solution, the steps comprising forming a sheet from wet furnish having a surface layer pervious to silicate solution and integral therewith a layer which is substantially impervious to silicate solution, partially drying the composite sheet, running the sheet with the impervious side down, applying silicate solution to the upper surface of the sheet, and drying the sheet.

43. In a method of making an article wherein fiber is made into a fiber sheet, the fiber sheet is impregnated with silicate solution and an article is formed from the sheet, the steps comprising forming a sheet from wet furnish having a surface layer pervious to silicate solution and integral therewith a layer which is substantially impervious to silicate solution, partially drying the composite sheet, running the sheet with the impervious side down, applying silicate solution to the upper surface of the sheet, removing surface moisture from the sheet, pressing an article from the sheet while moist, and drying the article.

44. In a method of making an article wherein a fibrous web is impregnated with sodium silicate solution, and an article is punched from the web while the web is moist, the steps comprising heating the web to remove a substantial proportion of surface moisture while retaining a substantial proportion of moisture in the interior of the web and then punching the article from the web while the web is in said condition.

45. A method of making paper which comprises forming a layer containing sulphite fiber and a binder on a paper making cylinder, forming a fibrous web containing mineral fiber and kraft fiber on a paper making cylinder, pressing together said layer and said web while moist to form a composite sheet, partially drying the sheet, applying alkali metal silicate solution to the web portion only of said composite sheet, and removing excess moisture from the sheet.

46. A method of making paper which comprises forming a layer containing sulphite fiber and a binder on a paper making cylinder, forming a fibrous web containing mineral fiber and kraft fiber on a paper making cylinder, pressing together said layer and said web while moist to form a composite sheet, partially drying the sheet, applying alkali metal silicate solution containing from about 10 parts of sodium silicate of about 40° to 42° Bé. and two parts of water by weight to about 10 parts of said sodium silicate to six parts of water by weight to the web portion only of said composite sheet, and removing excess moisture from the sheet.

47. A method of making paper which comprises forming a fibrous interfelted web containing a major proportion of mineral fiber and a minor proportion of alkali-treated cellulose fiber and subjecting said web to a bath of sodium silicate solution containing from about 10 parts of sodium silicate of about 40° to 42° Bé. and 2 parts of water by weight to about 10 parts of said sodium silicate and 6 parts of water, by weight.

48. A method of making paper which comprises forming a sheet comprising a first surface layer containing mineral fiber and alkali-treated cellulose fiber and a second layer containing acid treated organic fiber, and applying silicate solution to said first layer only.

49. A method which comprises forming a fibrous layer containing a binder on a paper making cylinder, forming fibrous web substantially free of said binder, uniting said layer and said web to form a composite sheet and then impregnating the web substantially free of binder from the external surface thereof with a binder other than the binder for said layer.

50. A method which comprises forming a fibrous layer containing a binder on a paper making cylinder, forming a fibrous web substantially free of said binder on a paper making cylinder, pressing said layer and said web together while the same are moist to form a composite sheet in which said web and said layer are interfelted, removing moisture from the sheet, and impregnating the web only with a binder other than the binder for said layer.

HAROLD W. GREIDER.
MARION F. SMITH.